United States Patent [19]

Frey et al.

[11] Patent Number: 4,942,944
[45] Date of Patent: Jul. 24, 1990

[54] SCREW PUMP FOR LUBRICATING GENERATOR BEARING

[75] Inventors: Gary A. Frey, West Chester, Ohio; James D. Lengel, Toms River, N.J.

[73] Assignee: Allied-Signal Inc., Morris Township, Morris County, N.J.

[21] Appl. No.: 332,064

[22] Filed: Apr. 3, 1989

[51] Int. Cl.$^5$ .......................... F16N 7/18; F16N 7/32; F16N 7/36
[52] U.S. Cl. ..................................... 184/27.1; 184/31; 384/465; 384/468; 384/471; 384/473
[58] Field of Search ................ 184/27.1, 31; 384/385, 384/394, 398, 399, 414, 462, 465, 468, 471, 472, 473

[56] References Cited

U.S. PATENT DOCUMENTS

| 2,234,574 | 3/1941 | Olcott | 384/465 |
| 2,470,365 | 5/1949 | O'Daniel | 184/31 |
| 2,848,284 | 8/1958 | Atkinson | 384/472 |
| 4,241,959 | 12/1980 | Frister | 384/472 |

FOREIGN PATENT DOCUMENTS 444496  3/1936  United Kingdom ................ 384/473

Primary Examiner—Douglas Hart
Attorney, Agent, or Firm—Glen M. Diehl; Howard G. Massung

[57] ABSTRACT

Apparatus to lubricate generator bearings with an oil-air mist is disclosed. A screw pump, preferably an assembly of components comprising a ring, a teflon seal, a pump rotor and a hub is secured onto a rotor shaft of a generator for rotation therewith. The rotor shaft has at least one passageway extending radially from an axial bore therein through which oil is transferred. The screw pump has a first orifice coincident with the rotor shaft passageway, a second orifice, a passageway extending from the first orifice to the second orifice through which the oil is directed into a cavity in the generator housing where it mixes with air to form a mist to lubricate the bearing, a circumferential surface fitting within an opening in the generator housing, and a helical groove in the circumferential surface through which the oil-air mist is evacuated during rotation of the generator rotor shaft.

20 Claims, 2 Drawing Sheets

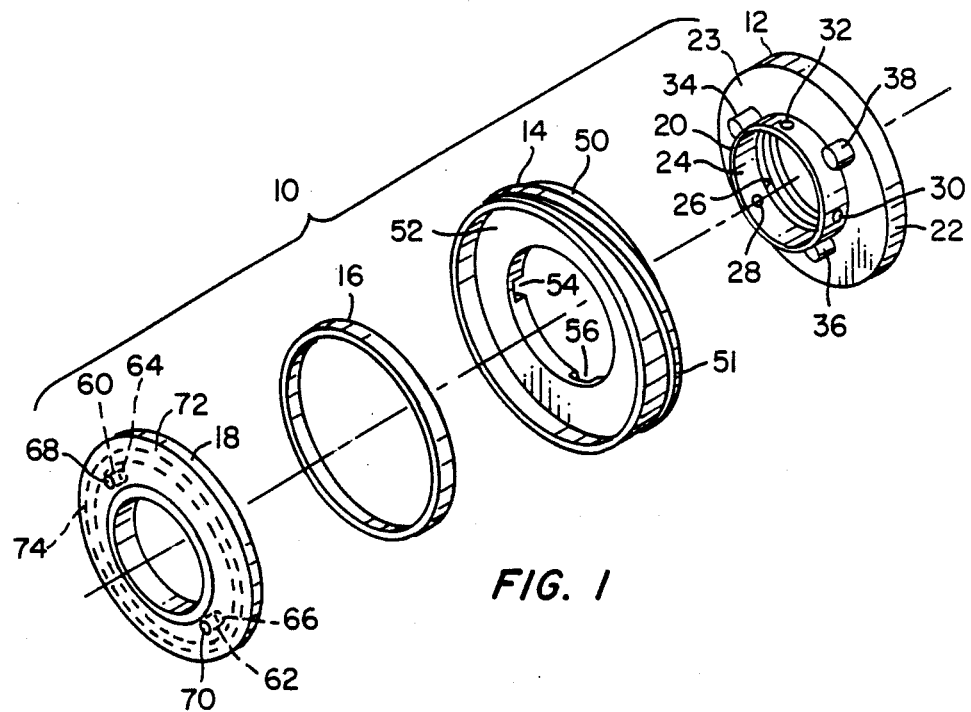
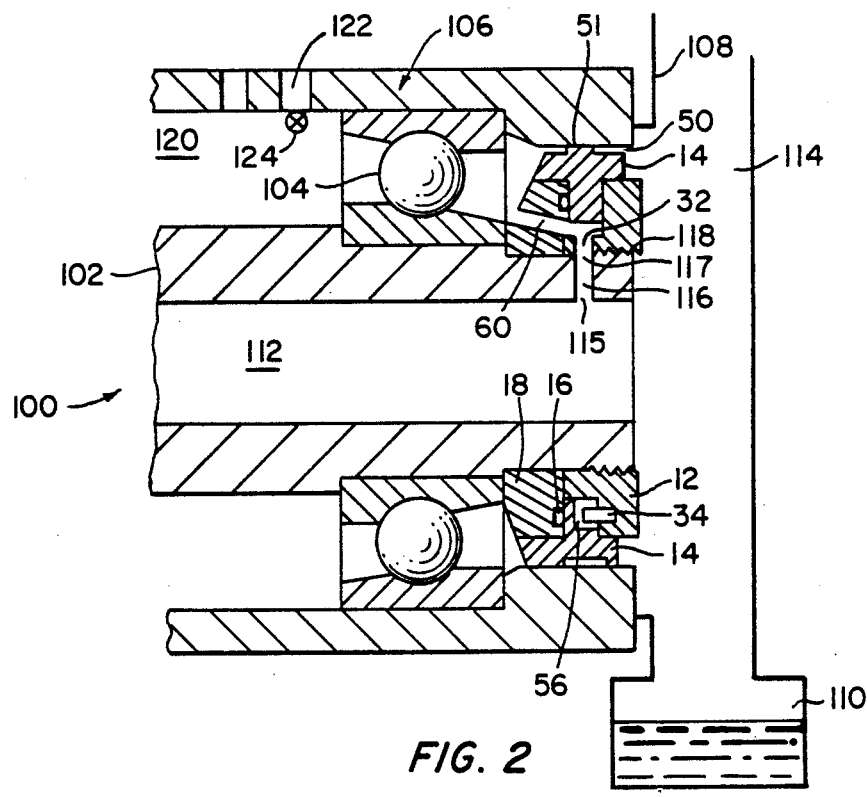

SCREW PUMP FOR LUBRICATING GENERATOR BEARING

BACKGROUND OF THE INVENTION

This invention relates to apparatus for lubricating bearings in generators. More specifically, it relates to a lubricating apparatus that supplies a lubricating mist to high speed generator bearings.

Prior lubrication systems for bearings and generators that operate at low rotational speeds, such as 12,000 rpm or less, generally flooded the bearings with oil. These systems adequately lubricated and cooled the bearings in such low speed applications. Further, the frictional forces in the bearings resulting from the oil did not significantly degrade the efficiency of the generator performance at these low speeds.

The recent trend in generator design, particularly in state of the art aircraft generators, is towards higher operational speeds. A requirement for an aircraft generator to rotate at speeds in excess of 20,000 rpm is not uncommon. The advantage of generators which rotate at such higher speeds is the reduction of the generator size and weight for a given load or output which results in more efficient power generation.

At the higher rotational speeds, however, lubrication systems which flood the bearings with oil cause some of the increased generator efficiency resulting from the higher operational speeds to be offset due to losses from bearing friction and from fluid friction. Any improvements in generator performance obtained by increasing the operational speed of the generator should not be offset by increased mechanical losses due to the lubrication system.

A lubrication system for bearings in high speed generators that minimizes mechanical losses, specifically bearing friction and fluid frictional losses, therefore, is needed.

SUMMARY OF THE INVENTION

The present invention provides apparatus for directing a lubricating mist towards a bearing in a generator. A housing having a circular opening and an air passageway supports a generator rotor shaft which is journaled in a bearing. The rotor shaft has an axial opening at a first end and an axial bore extending therefrom through which the lubricant, preferably oil, is circulated. The rotor shaft further has at least one passageway extending radially from an opening in the axial bore.

A screw pump is secured to the rotor shaft for rotation therewith. The screw pump has a circumferential surface fitting within the circular opening in the housing. A helical groove is provided in the circumferential surface in a manner such that when the screw pump rotates, the contents of the cavity wherein the bearing is located are evacuated. The pressure in the cavity is, therefore, decreased so that air is drawn into the cavity through the passageway in the housing.

The screw pump further has a first orifice coincident with the rotor shaft passageway, a second orifice and a passageway extending therebetween. The lubricant is fed under pressure through the screw pump passageway from the rotor shaft and directed through the second orifice in the screw pump into the housing cavity where the lubricant mixes with the air drawn into the housing cavity to form the mist.

In a preferred embodiment, the rotor shaft and the screw pump have a plurality of passageways through which the lubricant can be provided to the bearing. In the preferred embodiment, therefore, failsafe lubrication of the bearing is provided through a plurality of passageways.

It is further preferred that the screw pump be an assembly of components comprising a ring, a seal, a pump rotor and a hub. The ring has a hole in which the rotor shaft fits, a first face adjacent the bearing to be lubricated, a second face, a passageway extending from an opening in the second face to an opening in the first face through which the lubricant can be directed at the bearing, and a circular groove in the second face in which the seal is adapted to fit.

The pump rotor is adapted to fit loosely over the rotor shaft without blocking the passageway in the seal ring. The pump rotor has the circumferential surface fitting within the circular opening of the housing, the helical groove, a first recessed face which mates with the second face on the ring and a second recessed face having at least one radial slot therein.

The hub is preferably threaded onto the rotor shaft and has a drive pin mating with the radial slot in the pump rotor for causing the rotation of the pump rotor and an orifice coincident with each radially extending passageway in the rotor shaft.

Lubricant is fed under pressure through the hub orifices from the rotor shaft. Since the pump rotor is loosely disposed about the rotor shaft, the lubricant flows unimpeded to the ring passageway. From there, the lubricant enters the housing cavity and mixes with air to form a mist to lubricate the bearing. The lubricating mist is evacuated from the cavity through the helical groove during rotation of the screw pump assembly.

DESCRIPTION OF THE DRAWINGS

FIG. 1 illustrates an expanded view of the screw pump assembly in accordance with a preferred embodiment of the invention;

FIG. 2 illustrates a plan view of the screw pump assembly assembled on a generator rotor shaft;

DESCRIPTION OF THE PREFERRED EMBODIMENT

Figure 3:
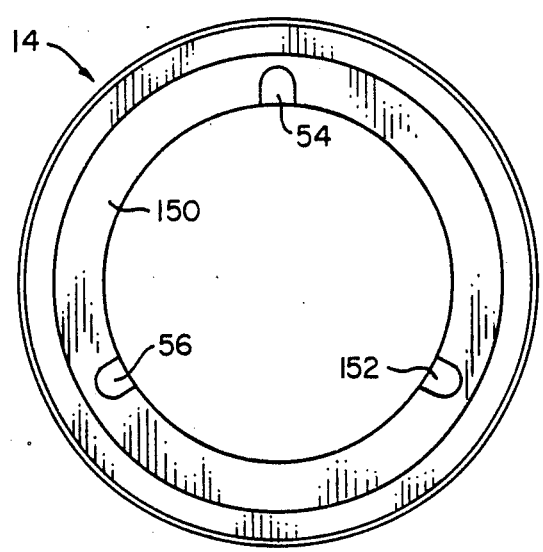
FIG. 3 illustrates a front view of a preferred embodiment of the pump rotor.

FIG. 1 illustrates an expanded view of a screw pump assembly 10 in accordance with a preferred embodiment of the present invention. The screw pump assembly 10 comprises a hub 12, a pump rotor 14, a seal 16 and a ring 18, each of which bas an opening in its center in which the rotor shaft of a generator is inserted.

The hub 12 includes a collar section 20 and a plate section 22 which has front face 23 and a rear face. The inner surface 24 of the collar section 20 preferably has a thread 26 which mates with a thread on the generator rotor shaft. The hub 12 is screwed onto the rotor shaft during assembly of the screw pump assembly 10 so as to rotate with the rotor shaft and to lock the other components of the screw pump 10 onto the rotor shaft. The rear face of the hub 12 preferably has three holes extending partially into the plate section 22 in which a spanner wrench can be inserted to secure the hub 12 to the generator rotor shaft. In an alternate embodiment, the hub can be secured to a rotor shaft having a thread on its end by means of a conventional nut.

The collar section 20 has at least one orifice which extends radially from the rotor shaft. In the preferred embodiment of FIG. 1, failsafe lubrication is provided by having three radially extending orifices 28, 30 and 32. Each of these orifices 28, 30 and 32 is coincident with an opening provided on the radial surface of the generator rotor shaft. The screw pump assembly 10 receives a lubricant, preferably oil, from the rotor shaft through these orifices. The hub 12 further has at least one drive pin pressed into a hole in the front face 23 of the plate section 22. In the preferred embodiment of FIG. 1, three drive pins 34, 36 and 38 are provided.

The pump rotor 14 has a circumferential surface 50 in which a helical groove 51 is provided, a front face 52 and a rear face. The front and rear faces are preferably recessed from the rim of the circumferential surface 50. This configuration permits the pump rotor 14 to provide a circumferential surface 50 with sufficient surface area for the required helical groove 51 with minimum weight. The rear face has a radial slot for each drive pin in the hub 12. The rear face of the pump rotor 14 of FIG. 1, therefore, has three radial slots, two of the slots 54 and 56 being illustrated, which are milled out at locations corresponding to the locations of the drive pins 34, 36 and 38 on the threaded hub 12. When the screw pump assembly 10 is assembled, the hub and drive pins mate with the slots in the pump rotor 14 such that the rotation of the hub 12 with the rotor shaft causes the rotation of the pump rotor 14.

The ring 18 has at least one passageway 60 and preferably a second passageway 62, each of which extend from the openings 64 and 66, respectively, in a rear face of the ring 18 to the openings 68 and 70, respectively, in the front face 72 of the ring 18. The rear face of the ring 18 mates with the recessed face 52 on the pump rotor 14 when the screw pump 10 is assembled on a rotor shaft. Additionally, the ring 18 has a groove 74 extending circumferentially around a portion of the rear face which mates with the recessed face 52 of the pump rotor 14. The seal 16 fits in the groove 74 to prevent leakage of lubricant between the mated faces. The seal 16 is preferably fabricated from teflon to minimize frictional losses.

FIG. 2 is a plan view of the screw pump assembly 10 of FIG. 1 mounted in the rear of a generator 100 on the end of the generator shaft 102. The generator rotor shaft 102 is journaled in a bearing 104. The bearing 104 is supported by a liner 106 in the generator housing 108. The bearing 104 is an angular contact bearing, however, the screw pump of the present invention can lubricate all bearing types The generator rotor shaft 102 has at least one passageway 116 which extends radially from an opening 115 at the bore 112 to an opening 117 at the radial surface of the shaft 102, through which lubricant from the reservoir 110 is provided under pressure to the screw pump 10. In the preferred embodiment, three such passageways are provided to ensure an adequate supply of lubricant to the screw pump 10 and to provide failsafe passageways in case one of the orifices clogs. The rotor shaft 102 also has a thread 118 around its circumference which mates with the thread 26 on the hub 12 when the screw pump 10 is assembled on the rotor shaft 102.

The rotation of the shaft 102, therefore, causes the rotation of the nub 12. The hub drive pins 34, 36 and 38, which mate with the respective pump rotor slots, cause the rotation of the pump rotor 14. The helical groove 51 around the circumferential surface 50 of the pump rotor 14 is threaded such that the pump rotor 14 evacuates the contents of the cavity 120 in the housing 108 when the shaft 102 rotates. The resulting reduction of pressure in the cavity 120 causes air to be drawn into the cavity 120 through a passageway 122 in the housing 108. A filter, not shown, filters and purifies the air before it enters be cavity 120, so that when the cavity 120 contents, namely the lubricant and air, are evacuated by means of the rotating helical groove 50 contaminates are not introduced into the supply of lubricant. Further, a check valve 124 is provided in the passageway 122. The check valve 124 permits air to enter the cavity 120 but prevents the lubricant from leaking out of the cavity 120 through the passageway 122 at low rotational speeds when the screw pump 10 is not capable of reducing the pressure in the cavity 120 to below atmospheric pressure.

As mentioned before, the lubricant is provided to the screw pump 10 through the hub orifices 28, 30 and 32 from coincident openings in the rotor shaft 102. The reduced pressure in the housing cavity 120 resulting from the rotation of the pump rotor 14 causes the pump rotor 14 to compress against the seal ring 18 and the teflon seal 16 so that the lubricant can not escape between the mating faces of the seal ring 18 and the pump rotor 14. The lubricant, therefore, travels through the orifice 32 to the passageways 60 and 62. The pump rotor 14 is constructed with loose radial clearance to the rotor shaft 102 so that the pump rotor 14 does not impede the flow of the lubricant to passageways 60 and 62. The lubricant then exits the screw pump through the passageways 60 and 62 provided in the ring 18 and enters the cavity 120. In the cavity 120, the lubricant mixes with air being drawn in through channel 122 to form a mist which lubricates the bearings.

The mist is evacuated from the cavity 120 by the rotation of the pump rotor 14. The circumferential surface 50 of the pump rotor 14 should be designed such that, during its rotation, it evacuates an amount of lubricant from the cavity 120 equal to the amount of the lubricant introduced by the screw pump 10, so that the lubricant does not flood the bearing 104, which would result in mechanical inefficiencies.

The diameter of the passageways in the screw pump and the speed of rotation of the shaft 102 control the amount of lubricant provided to the cavity 120 and the amount of air drawn in. The mist supplied to the bearing 104, therefore, is controlled by these parameters which should be sized accordingly.

Figure 4:
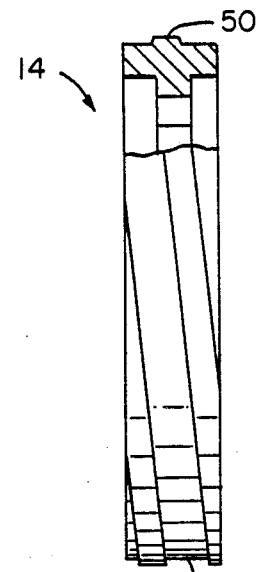
FIG. 4 illustrates a side view of the pump rotor of FIG. 3.

FIGS. 3 and 4 illustrate the pump rotor 14. The three radial slots 54, 56 and 152 are milled in the surface of the face 150. This preferred drive mechanism for the pump rotor 14 allows the pump rotor 14 to be loosely disposed about the rotor shaft 102 without impeding the passageways 60 and 62 in the ring 18 or the orifices 28, 30 and 32 in the hub 12. This allows the pump rotor 14 to rotate around the true center of the opening in the housing 108 so as to improve the efficiency with which the mist is evacuated from the cavity 120 through the helical groove 51. The diameter of the hole in the pump rotor 14, therefore, is not a critical manufacturing parameter, so long as it is large enough so as to provide a space for the lubricant to flow from the orifices 28, 30 and 32 in the collar section 20 on the hub 12 to the passageways 60 and 62 in the ring 18.

The dimensions associated with the circumferential surface 50 and the helical groove 51 depend on a generator's operational parameters, such as the speed of rotation. For a typical generator rotating at 27,000 RPM, the outer diameter of the pump rotor 14 is preferably 0.001 inch smaller than the inner diameter of the circular opening in the housing 108. This tight clearance to the housing liner 106 enhances the vacuum created in the cavity 120. Further in this example, the helical groove 51 on the circumferential surface 50 of the pump rotor 14 preferably has a width of 5/32 inches and a depth in the range of 0.011-0.012 inches deep. The circumferential surface 50 preferably has four threads per inch. The threading should be righthanded or lefthanded according to the direction of rotation of the rotor shaft 102 in order to cause the evacuation of the cavity 120 in the housing 108.

Figure 5:
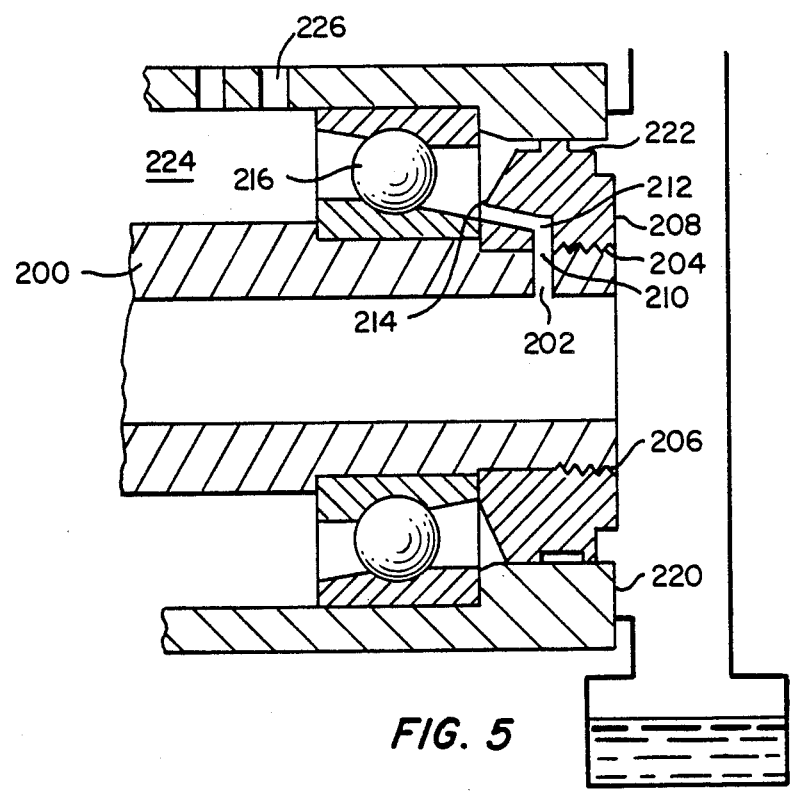
FIG. 5 illustrates a plan view of an alternative embodiment of the screw pump.

FIG. 5 illustrates an alternative embodiment of the present invention. The rotor shaft 200 is again provided with at least one radially extending passageway 202 as well as means for securing a screw pump for rotation therewith, such as a thread 204 which mates with a thread 206 on the screw pump or with a conventional nut. The screw pump 208 of the alternative embodiment is comprised of a single component. An orifice 210 is provided to mate with the passageway 202. The screw pump has a passageway 212 from the orifice 210 to a second opening 214 for receiving oil from the rotor shaft 200 and providing an oil to the cavity 214. The screw pump 208 of the alternative embodiment further has a circumferential surface with an outer diameter sized to fit within a circular opening provided in the generator housing 220. A helical groove 222 is provided in the circumferential surface.

The rotation of the screw pump 208 on the rotor shaft causes the evacuation of the cavity 224 so that the pressure in the cavity 224 drops and new air is drawn in through the passageway 226 in the housing 220. The oil provided through the passageway 212 mixes with the air drawn into the cavity 224 to provide lubrication for the bearing 216.

We claim:

1. Apparatus for providing a lubricating mist to a bearing in a rotating machine, comprising:
    a housing having a circular opening and a passageway through which air can enter a cavity in said housing;
    a rotor shaft secured in said housing for rotation therein having an axial opening, an axial bore extending from said axial opening through which a lubricant can be circulated and a radial passageway extending from a first opening at said axial bore to a second opening; and
    a screw pump secured to said rotor shaft for rotation therewith and having a first orifice coincident with said second opening in said rotor shaft, a second orifice, a passageway extending from said first orifice to said second orifice through which said lubricant can be directed into said cavity to form the lubricating mist, a circumferential surface fitting within said circular opening in said housing, and a helical groove in said circumferential surface through which the lubricating mist is evacuated from said cavity during rotation of said rotor shaft.

2. The lubricating apparatus as claimed in claim 1, further comprising:
    check valve means in said passageway in said housing for blocking air from exiting said cavity through said passageway in said housing.

3. The lubricating apparatus as claimed in claim 2, further comprising:
    filtering means in said passageway in said housing for purifying air entering said cavity.

4. The lubricating apparatus as claimed in claim 1, wherein said lubricant is oil.

5. The lubricating apparatus as claimed in claim 1, wherein said screw pump is secured to said rotor shaft by mating threads provided on a circumferential surface at an end of said rotor shaft and on an inner sleeve of said screw pump.

6. The lubricating apparatus as claimed in claim 1, wherein said screw pump is secured to said rotor shaft by a hex nut fastened onto a thread on said rotor shaft.

7. The lubricating apparatus as claimed in claim 1, wherein the diameters of said rotor shaft passageway and said screw pump passageway are sized in accordance with a rotational speed of the generator to direct a controlled amount of lubricant at the bearing.

8. The lubricating apparatus as claimed in 1, wherein said rotor shaft has a plurality of radial passageways, each of which extend from a first opening at said axial bore to a second opening, and said screw pump has a plurality of passageways extending from a first orifice to a second orifice, each of said first orifices in said screw pump being coincident with one of said second openings in said rotor shaft.

9. Apparatus for providing a lubricating mist to a bearing in a generator, comprising:
    a housing having a circular opening and a passageway through which air can enter a cavity in said housing;
    a rotor shaft secured in said housing for rotation therein having an axial opening, an axial bore extending from said axial opening through which a lubricant can be circulated and a radial passageway extending from a first opening at said axial bore to a second opening;
    a ring adapted for receipt on said rotor shaft in a position adjacent the bearing having a first face with an opening therein, a second face with an opening therein and a passageway between said openings;
    a hub secured to said rotor shaft for rotation therewith having a collar section with a radially extending orifice coincident with said second opening in said rotor shaft through which said lubricant can be received from said rotor shaft and directed through said passageway in said ring into said cavity to form the lubricating mist, and a plate section having a face in which at least one drive pin is supported; and
    a pump rotor adapted for receipt on said rotor shaft without blocking said passageway in said ring, a circumferential surface fitting within said opening in said housing, a helical groove in said circumferential housing through which the lubricating mist is evacuated from said cavity during rotation of said rotor shaft, a first face which mates with said second face on said ring and a second face having at least one radial slot therein adapted to receive said drive pin such that said pump rotor rotates with said hub.

10. Lubricating apparatus as claimed in claim 9, further comprising:

a circular seal in a circular groove in a portion of said second face of said ring engaging said first face of said pump rotor.

11. The lubricating apparatus as claimed in claim 10, wherein said circular seal is fabricated with teflon.

12. The lubricating apparatus as claimed in claim 9, wherein said lubricant is oil.

13. The lubricating apparatus as claimed in claim 9, further comprising:
check valve means in said passageway in said housing for blocking air from exiting said cavity through said passageway in said housing.

14. The lubricating apparatus as claimed in claim 13, further comprising:
filtering means in said passageway in said housing for purifying air which enters said cavity.

15. The lubricating apparatus as claimed in claim 9, wherein said screw pump is secured to said rotor shaft by mating threads provided on a circumferential surface at an end of said rotor shaft and on an inner sleeve of said screw pump.

16. The lubricating apparatus as claimed in claim 9, wherein said screw pump is secured to said rotor shaft by a hex nut fastened onto a thread on said rotor shaft.

17. The lubricating apparatus as claimed in claim 9, wherein said ring passageway, said hub orifice and said rotor shaft passageway have diameters sized in accordance with a rotational speed of the generator to direct a controlled amount of lubricant at the bearing.

18. The lubricating apparatus as claimed in claim 9, wherein said rotor shaft has a plurality of said radial passageways, each of which extend from a first opening at said axial bore to a second opening, and said hub has a plurality of orifices each of which are coincident with one of said second openings in said rotor shaft.

19. The lubricating apparatus as claimed in claim 18, wherein said ring has a plurality of said passageways each of which extend from a first opening to a second opening.

20. The lubricating apparatus as claimed in claim 9, wherein said first and second faces in said pump rotor are recessed from said circumferential surface.

* * * * *